(12) United States Patent
Greenberger

(10) Patent No.: US 10,440,871 B1
(45) Date of Patent: Oct. 15, 2019

(54) ERGONOMIC MATERIAL MOVING

(71) Applicant: Hal P. Greenberger, Natick, MA (US)

(72) Inventor: Hal P. Greenberger, Natick, MA (US)

( * ) Notice: Subject to any disclaimer, the term of this patent is extended or adjusted under 35 U.S.C. 154(b) by 0 days.

(21) Appl. No.: 15/969,700

(22) Filed: May 2, 2018

(51) Int. Cl.
*A01B 1/02* (2006.01)
*E01H 5/02* (2006.01)

(52) U.S. Cl.
CPC .............. *A01B 1/026* (2013.01); *E01H 5/02* (2013.01)

(58) Field of Classification Search
CPC .. A01B 1/026; E01H 5/02; B25G 1/04; B25G 3/00
USPC .......................... 294/54.5, 58, 178
See application file for complete search history.

(56) References Cited

U.S. PATENT DOCUMENTS

| | | | |
|---|---|---|---|
| 725,905 A * | 4/1903 | Williams | |
| 1,449,702 A * | 3/1923 | Sizemore | A01B 1/026 294/58 |
| 2,416,414 A * | 2/1947 | Spencer | A01B 1/026 294/58 |
| 2,521,441 A | 9/1950 | Bickley | |
| 4,050,728 A | 9/1977 | Davidson | |
| 4,103,954 A | 8/1978 | Vaslas | |
| 4,200,324 A | 4/1980 | Helton | |
| D270,612 S * | 9/1983 | Storlie | 294/58 |
| 4,615,553 A * | 10/1986 | Hultine | A01B 1/22 16/426 |
| 4,793,645 A | 12/1988 | Decker | |
| 5,431,468 A | 7/1995 | Rosenshine | |
| 5,472,252 A * | 12/1995 | Barone | A01B 1/026 294/54.5 |
| 5,487,577 A | 1/1996 | Ball | |
| 5,704,672 A | 1/1998 | Sims | |
| 5,921,600 A | 7/1999 | Lucas | |
| 6,883,845 B2 | 4/2005 | Douziech | |
| 7,032,942 B2 * | 4/2006 | Stuart | A01B 1/026 16/426 |
| 7,077,444 B2 | 7/2006 | Kaufman et al. | |
| 8,182,007 B2 * | 5/2012 | Fisher | B25G 3/00 294/54.5 |
| 8,757,688 B1 | 6/2014 | Hajek | |
| 9,670,632 B2 | 6/2017 | Behan et al. | |
| 2005/0017525 A1 * | 1/2005 | Douziech | E01H 5/02 294/58 |
| 2005/0206178 A1 | 9/2005 | Hoeft | |
| 2008/0042458 A1 * | 2/2008 | Ricket | A01B 1/022 294/58 |
| 2008/0054660 A1 | 3/2008 | Wensman | |
| 2008/0315602 A1 | 12/2008 | Chesness | |

* cited by examiner

*Primary Examiner* — Dean J Kramer

(57) ABSTRACT

Material moving devices include ergonomic improvements that reduce extraneous work required and lessen strain experienced by users. Material moving devices include a head for receiving material to be moved and a first elongated handle with a grip at the far end for gripping by a first hand of a user. A second handle is coupled to the head for gripping by a second hand of the user. The second handle can be pivotably coupled to the head in a location or locations generally longitudinally aligned with the expected location of the center of mass of the head when loaded with material to be moved.

19 Claims, 7 Drawing Sheets

ERGONOMIC MATERIAL MOVING

BACKGROUND

This disclosure relates to improvements to unpowered material moving devices. Examples of material moving devices such as shovels are disclosed herein. The examples disclosed have ergonomic designs which reduce extraneous work required and lessen strain experienced by users.

Existing shovels typically comprise a head for transporting or moving a load of material, for example snow, dirt, gravel, etc., an elongated handle with one end rigidly connected to the shovel head, where the elongated handle can be characterized by a central axis extending away from a rear portion of the head generally in the direction of a longitudinal centerline of the head, and a grip connected to the second end of the long shovel handle. Users of traditional shovels typically grab the shovel grip at the end of the elongated handle with one hand and grasp the elongated shovel handle with their second hand placed near where the elongated handle couples to the head. Users of traditional shovels need to bend down to lift material. This requires users to either engage their legs to lift, or if they lift improperly to engage their backs risking potentially injury. The user's hands are displaced away from the typical locations of the center of mass of the head (when loaded with material) requiring users to react torques that arise when the shovel is lifted. Requiring users to bend over and react extraneous torques makes traditional devices less efficient to use.

SUMMARY

All examples and features mentioned below can be combined in any technically possible way. It is contemplated herein that examples of material moving devices having various handle, grip, and head designs as disclosed herein can be used in any combination, even if that specific combination is not explicitly disclosed.

In one aspect, an apparatus for moving materials by hand includes a head for receiving materials; a first elongated handle having first and second ends, the first end rigidly coupled to the head, the elongated handle characterized by a central axis extending away from a rear portion of the head generally in the direction of a longitudinal centerline of the head; a first grip coupled to the second end of the first handle, for holding by a first hand of a user, and; a second handle, the second handle is generally U shaped having first and second ends where the first end of the second handle is pivotably coupled to a first coupling location on a first side wall of the head and the second end of the second handle is pivotably coupled to a second coupling location on a second side wall of the head, the second handle for holding by a second hand of a user.

Embodiments may include one of the following features, or any combination thereof. An imaginary line connecting the first and second coupling locations is located longitudinally forward of a rear wall of the head and longitudinally rearward of a front chipping edge of the head. The imaginary line connecting the first and second coupling locations is longitudinally aligned with an average expected location of the center of mass of the material moving apparatus when the head is loaded with material to be moved. The imaginary line connecting the first and second coupling locations is located within the middle ½ of the longitudinal span of the head. The imaginary line connecting the first and second coupling locations intersects a center plane that longitudinally bisects the head within the middle ¾ of the longitudinal span of the head.

The second handle further includes a spring, the spring is energized when the material moving apparatus is lifted by the second handle. The normal distance between the location of the user's hand on the second handle and the imaginary line joining the first and second coupling locations increases by between 1 and 9 inches compared to the normal distance at rest when the material moving apparatus is lifted by the second handle and the head of the material moving device is loaded with 20 lbs. of material to be moved.

The second handle is formed from a rigid tube. The second handle is constructed and arranged to provide a stiffness which is used to hold the first and second ends in place in first and second coupling structures located at the first and second coupling locations. A grip structure is fit around a portion of the rigid tube. The grip structure can be slid back and forth by the user over the portion of the rigid tube to enable the user to adjust their grip location to compensate for variations in the center of mass of the head when loaded with material to be moved. The grip structure spans the width of the head of the material moving device.

The second handle is formed from a flexible tube. A grip structure is fit around a portion of the flexible tube. The grip structure spans the width of the head of the material moving device.

The second handle is formed from a cable. The second handle further comprises a grip structure where the cable is threaded through the grip structure. The cable is flexible in elongation.

The second handle includes a user adjustable handle length mechanism, wherein the user adjustable handle length mechanism is constructed and arranged to allow the user to alter a pivot radius of the second handle. The user adjustable handle length mechanism comprises first and second arms and a connector section joining the pair of arms, wherein first and second arms can slide back and forth relative to the ends of the connector.

The material moving device includes a structure for holding the second handle in a fixed location with respect to the body of the material moving device, where the structure for holding the second handle in a fixed location is chosen from the group consisting of: a mechanical clip, a magnetic clasp, a detent mechanism incorporated into a pivot coupling mechanism that pivotably couples the second handle to the head, and a friction fit incorporated into a pivot coupling mechanism that pivotably couples the second handle to the head.

The material moving device includes a second handle with a grip that allows the user to grip the second handle at a location displaced away from the longitudinal centerline of the material moving device.

A pivot radius of the second handle is a pivot radius of the second handle is greater than one half of the length of the first elongated handle. The pivot radius of the second handle is less than the length of the first elongated handle.

In another aspect, a method for moving materials by hand includes receiving materials by a head of a material moving device; gripping, with a first hand of a user, an elongated, first handle of the material moving device, wherein the elongated first handle comprises a first end rigidly coupled to the head and a second end to which is coupled a first grip for holding by the first hand of the user, the elongated first handle characterized by a central axis extending away from a rear portion of the head generally in the direction of a longitudinal centerline of the head, and gripping by a second hand of the user a second handle, wherein the second handle is pivotably coupled to the head, wherein the second handle is generally U shaped having first and second ends, wherein the first end of the second handle is pivotably coupled to a first location on the head, the first location on a first side of the head, and wherein the second end of the second handle is pivotably coupled to a second location on the head located on a second side of the head.

In another aspect, a kit for use with existing material moving devices includes a handle and a pair of pivot coupling assemblies for pivotably coupling the handle to a head of a existing material moving device.

DETAILED DESCRIPTION

Figure 1:
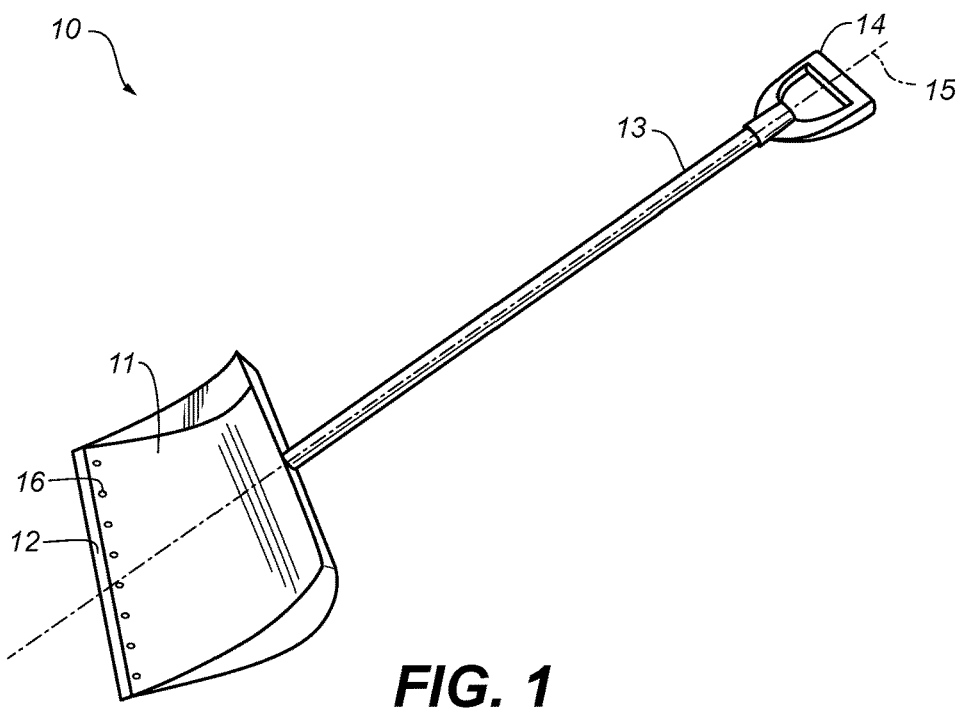
FIG. 1 is a perspective view of a prior art material moving device.

Prior art material moving device shovel 10 is shown n FIG. 1. Head 11 of shovel 10 is used to receive material to be moved. A first end of elongated handle 13 is rigidly coupled to head 11. Grip 14 is coupled to a second (far) end elongated handle 13. Scraping structure 12 is affixed to the front of head 11 with a plurality of rivets 16. Scraping structure 12 is typically formed from aluminum or coated steel. A user grasps grip 14 with one hand and grasps elongated handle 13 with their second hand near the location where elongated handle 13 couples to head 11.

To load head 11 with material located on the ground, a user needs to either bend their knees deeply or bend their back because one of their hands grasps elongated handle 13 in close proximity to head 11. This requires the user to perform extra work by repeatedly bending over or squatting, and also increases risk of back injury.

Figure 2:
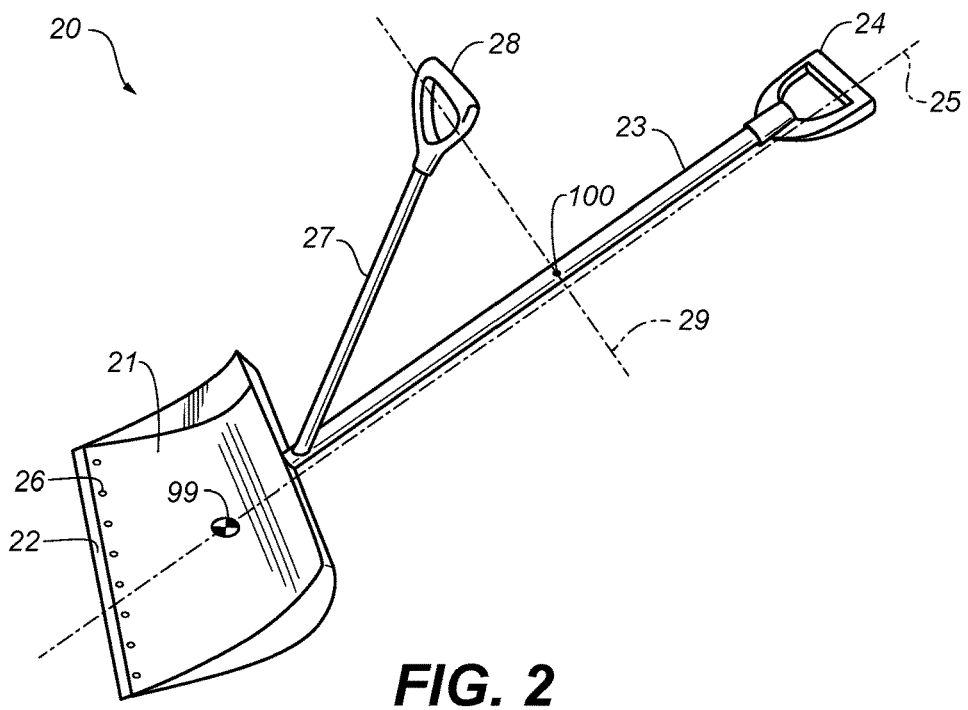
FIG. 2 is a perspective view of a prior art material moving device incorporating a second handle.

A second prior art material moving device is depicted in FIG. 2. Shovel 20 of FIG. 2 is identical to shovel 10 of FIG. 1 except for the addition of second handle 27 which also includes grip 28. Second handle 27 is rigidly coupled to elongated handle 23 near the point where the user's second hand would grasp elongated handle 23 if second handle 27 were not present (i.e. near the point elongated handle 23 is coupled to head 21). Second handle 27 extends at an angle upward relative to elongated handle 23, where both handles 27 and 23 lie in a plane that longitudinally bisects head 21 through axis 25. A user grasps grip 24 of elongated handle 23 as before, but now grasps grip 28 with their second hand. By providing second handle 27 with grip 28, a user can stand more upright when using shovel 20.

Shovel 20 suffers from numerous drawbacks. The attachment point of second handle 27 to elongated handle 23 is displaced away from the location of the center of mass (CM) 99 of loaded head 21 (the location of CM 99 is shown in one example location; the actual location will vary with the distribution of the load in head 21). Furthermore, since second handle 27 extends up at an angle which is less than 90 degrees from axis 25, and is vertically aligned with axis 25, the projected location along axis 25 of the user's second hand when grasping grip 28 (shown as point 100) is yet farther away from CM 99 than the distance the connection point of second handle 27 to elongated handle 23 is away from CM 99. The resulting torque when head 21 is lifted (by user's second hand holding grip 28) will need to be reacted by the user in order to keep shovel 20 from rotating forward when lifted. Reacting the torque requires the user to provide extra work making the task of moving material with shovel 20 more strenuous than necessary. Another drawback arises due to the fixed nature of the coupling between second handle 27 and elongated handle 23. It is less efficient biomechanically to throw a load off head 21 of shovel 20 if second handle 27 has a fixed relationship relative to elongated handle 23 than if the angle of second handle 27 with respect to elongated handle 23 (or more specifically the distance between the user's second hand grasping grip 28 and the user's first hand grasping grip 24) is allowed to vary.

The length of a throwing stroke can be increased if a second handle of a material moving device is allowed to pivot (the entire second handle rotates relative to the body of the material moving device about its connection with the body of the material moving device) so that at the end of the throwing stroke the user's hand grasping the second handle moves closer to the end of the elongated handle of the material moving device. When the length of the throwing stroke is increased, material can be thrown out of the material moving device farther with less effort.

The stability when lifting the head of a material moving device by a second handle when the head is loaded with material can be increased if the second handle is coupled to the head in two locations on opposite sides of the head. The locations can be chosen such that a line drawn through the pair of coupling locations passes as close as possible to the expected location of the CM of the loaded head, which necessarily moves the coupling locations away from the rear wall or front edge of the head towards the longitudinal midpoint of the head. Having a "lifting axis" aligned with the approximate CM of the loaded head minimizes extraneous torques a user needs to react to keep the head from pivoting and potentially spilling the load. Using a pair of coupling locations allows for compensation of laterally off-center loads. Laterally off-center loads that are not aligned with second handles using a single coupling location to the elongated handle introduce extraneous torques that need to be reacted by the user. Coupling locations are described in more detail in subsequent sections.

The stability of lifting a loaded head of a material moving device with a second handle is also improved if the second handle is constructed such that it can be gripped across a region that when projected onto the head surface spans at least ½ the width but preferably spans substantially the entire width of the head of the material moving device. The user can grasp the second handle at positions aligned across the width of the head which allows the user to easily compensate for laterally off-center loads. A second handle, even if it includes a pair of coupling locations on opposite sides of the head of the material moving device does not allow a user to compensate for laterally off-center loads if the second handle only includes a centered grip position.

Figure 3:
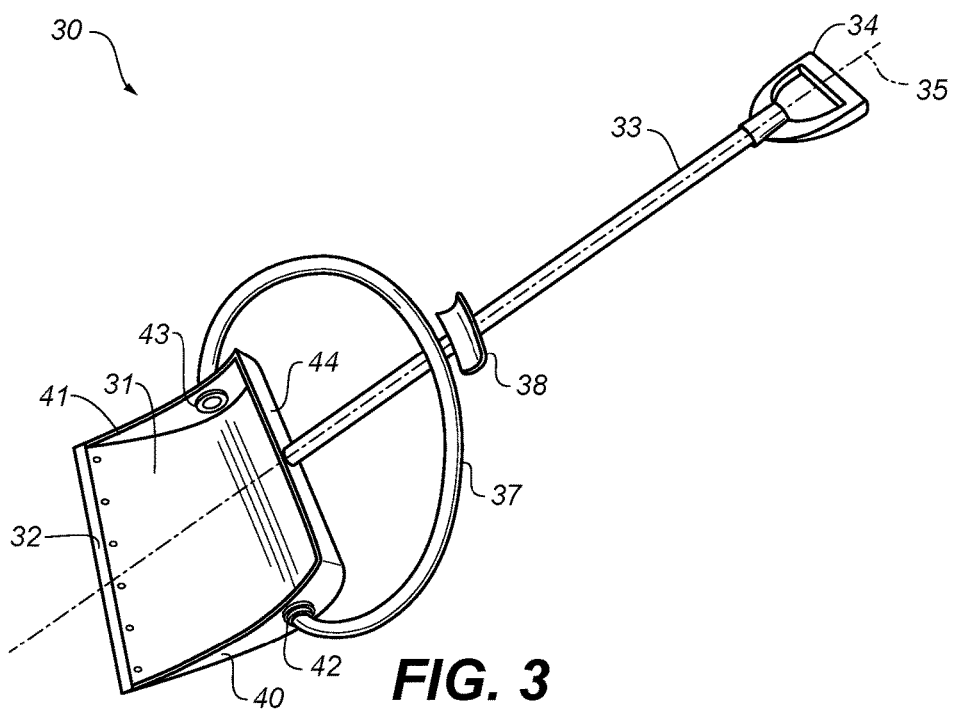
FIG. 3 is a perspective view of one non-limiting example of a material moving device incorporating a second handle.

One non-limiting example of novel material moving device 30 is depicted in FIG. 3. A first end of elongated handle 33 is rigidly fixed to head 31. Grip 34 is affixed to a second, far end of elongated handle 33. Elongated handle 33 is characterized by a central axis extending away from a rear portion of the head 31 generally in the direction of a longitudinal centerline 35 of the head. The elongated handle 33 (and elongated handles described as part of other examples disclosed herein) is generally located within a plane that longitudinally bisects the head of the disclosed material moving devices. When a load of material is centered within the head, aligning the elongated handle to be in the bisecting plane minimizes twisting about the central axis of the elongated handle. These elements are similar to like elements shown with respect to shovels 10, 20 of FIGS. 1 and 2. Shovel 30 also incorporates a second handle 37. Handle 37 is constructed such the pivot radius of handle 37 is at least ½ the length of the elongated handle, where the pivot radius is the normal distance between an imaginary axis drawn through the pair of coupling locations of handle 37 to head 31 (shown as axis 55 in FIG. 4) and a central grip location on handle 37 aligned with axis 35 (the central grip location would touch handle 33 if handle 37 were pivoted sufficiently), and the length of the elongated handle is defined as the distance between the outward surface of the back wall of the head where the elongated handle couples to the head and the central axis of the gripping structure on the opposite end of the elongated handle.

If the pivot radius is small, generally less than ½ the elongated handle length, the benefits of having a second handle are reduced as a user must start to bend over more to use the material moving device. If the pivot radius becomes too large, for example greater than the elongated handle length, the user's hand gripping the second handle will be raised higher to the point where lifting strength is reduced, making the device more difficult and tiring to use. In one non-limiting example the pivot radius is in the range between ½ of the elongated handle length and the total elongated handle length.

In one non-limiting example, the pivot radius is made adjustable by the user to accommodate users of different heights. A taller user may adjust the pivot radius so that it is closer to the length of the elongated handle where a shorter user may adjust the pivot radius so that it is closer to ½ the length of the elongated handle. A taller user can use a device with a longer pivot radius without having their hand grasping the second handle being raised beyond the point where lifting strength decreases significantly. Ideally, a taller user would use a device with both a longer elongated handle and a larger second handle pivot radius than would a shorter user. In one non-limiting example, both the length of the elongated handle and the pivot radius are made variable by the user. In one non-limiting example, the pivot radius is allowed to increase beyond ¾ of the length of the elongated handle to accommodate taller users. Since the user is taller, the users hand gripping the second handle with longer pivot radius will still not be raised so high past the point where lifting strength reduces significantly.

Second handle 37 differs from second handle 27 of FIG. 2 in a number of significant respects. Second handle 37 is coupled to head 31, whereas second handle 27 was coupled to elongated handle 23 (not to head 21). By coupling second handle 37 to head 31, the locations where a user grasps handle 37 can be located more in line with the expected location of the CM of head 31 when loaded.

Handle 37 is coupled to head 31 in two spaced apart locations 42 and 43 whereas handle 27 was coupled to handle 23 in a single location. The two locations 42 and 43 are spaced to the left and right of longitudinal centerline 35 that bisects head 31. By coupling handle 37 to two spaced apart locations on head 31 which preferably are located along left and right sides of head 31, head 31 can be more easily controlled with less effort when lifted, such that off center loads in head 31 are more easily compensated for.

Furthermore, handle 37 is pivotably coupled to head 31 in the two coupling locations 42 and 43 described above, whereas handle 27 was fixedly coupled to handle 23. By incorporating pivot coupling, the user's hand grasping handle 37 is relieved from having to react torques about the coupling locations. Additionally, pivot coupling allows the angle of handle 37 to change so that handle 37 can be aligned in the direction the head is being lifted by the user. This alignment increases the efficiency of the device. Pivot coupling is described in more detail in subsequent sections. It is contemplated herein that any of the above described differences in coupling can be combined with each other in any combination.

In the non-limiting example depicted in FIG. 3, one end of second handle 37 is pivotably coupled to side wall 40 of head 31 with pivot structure 42, and a second end of second handle 37 is pivotably coupled to opposite side wall 41 of head 31 with pivot structure 43. Locating pivot coupling structures along the side walls of head 31 allows the pivot axis of handle 37 to be more closely aligned with the expected locations of the center or mass of head 31 when loaded with material to be removed.

Pivot structures 42 and 43 can be any type of known pivot structure that allows relative rotation of second handle 37 with respect to head 31. For example, bearings such as ball bearings can be fit into holes in side walls 40 and 41, where the outer races of each ball bearing are fixed to side walls 40 and 41 respectively and the inner races of each ball bearing are fixed to first and second ends of handle 37. However, ball bearings are not required, and simpler structures allowing relative rotation of handle 37 with respect to head 31 are contemplated herein. Additional examples of pivoting structures are described later in this disclosure. It should be noted that any of the example material moving devices disclosed herein can use any type of known pivoting structure between a second handle and another portion of the material moving device, whether or not use of the specific pivot structure with the material moving device is disclosed or depicted herein.

As described above, second handle 37 is pivotably coupled to head 31 in two locations. These two locations are displaced apart from each other across the width of head 31. In the non-limiting example depicted in FIG. 3, pivot structures 42 and 43 are located in side walls 40 and 41, though coupling to the side walls is not required.

It may be desirable to move the second handle 37 into a position where it is out of the way, either for storage or for instances when a user may not wish to use the second handle. Various structures for holding the position of the second handle fixed with respect to the body of the material moving device are contemplated herein. In the example depicted in FIG. 3, clip 38 is attached to elongated handle 33 of the material moving device 30. Clip 38 allows second handle 37 to be removably attached to elongated handle 33. If the space spanned between the two ends of second handle 37 is sufficient to allow head 31 to pass through, a clip could be positioned on the opposite side of elongated handle 33 from that shown in FIG. 3, or clips could be located on both sides of elongated handle 33. FIG. 3 depicts a clip that mechanically holds handle 37 in place against handle 33, but any method of removably attaching second handle 37 to elongated handle 33 could be used and is contemplated herein. The location along elongated handle 33 of clip 38 can be made adjustable by the user so that the clip can accommodate adjustments in the length of second handle 37.

In one non-limiting example, a structure for holding the position of the second handle can be magnetic clasp. A magnetic clasp (not shown) can be designed to accommodate variation in handle length without needing to be repositioned. In one non-limiting example, elongated handle 33 could be made from ferromagnetic material, or a length of ferromagnetic material such as silicon steel could be embedded along a section of elongated handle 33, and a magnet can be located on second handle 37. Magnetic attraction between the magnet and the ferromagnetic material provides the necessary holding force.

Any of the clips disclosed herein, or any known method of removable attachment allowing a second handle to be removably attached to a first handle of a material moving device can be used with any example material moving device disclosed herein.

Rather than using a clip, in one non-limiting example a structure for holding the second handle in a position can be a detent mechanism. Detent structures (not shown) can be added to one or both pivot coupling assemblies of a material moving device. It should be noted that methods of providing detent positions in structures accommodating relative rotation between portions of the structures are well known in the art and are not specifically described or shown here. The detent(s) provide a holding force to keep a second handle in a predetermined rest position, such as holding the second handle in close proximity to a first elongated handle. The detent performs a similar function to the clip assembly of FIG. 3 or the magnetic clasp described above. A detent assembly can hold the second handle in a predetermined position when the handle length is adjustable without requiring changes such as with mechanical holding structure like a clip that may need to be moved if handle length is changed. The operation of detent structures can be independent of any structure used to alter the length of the second handle. Any material moving device disclosed herein where a second handle is pivotably coupled in any way to some other portion of the material moving device can be used with a detent mechanism to provide a predetermined hold position.

Rather than use a detent assembly as discussed above, in one non-limiting example friction force in the pivot coupling mechanism is controlled. A friction fit for holding the second handle in a fixed location when force is not being applied by the user is incorporated into the pivot coupling mechanism. Materials and dimensions are chosen such that the static coefficient of friction of the friction fit in the pivot coupling is just high enough to hold the second handle in a fixed location when the user is not applying a force to the second handle, while the sliding coefficient of friction of the friction fit is made as low as possible to minimize energy dissipation in the pivot coupling so efficiency is not compromised.

Figure 4:
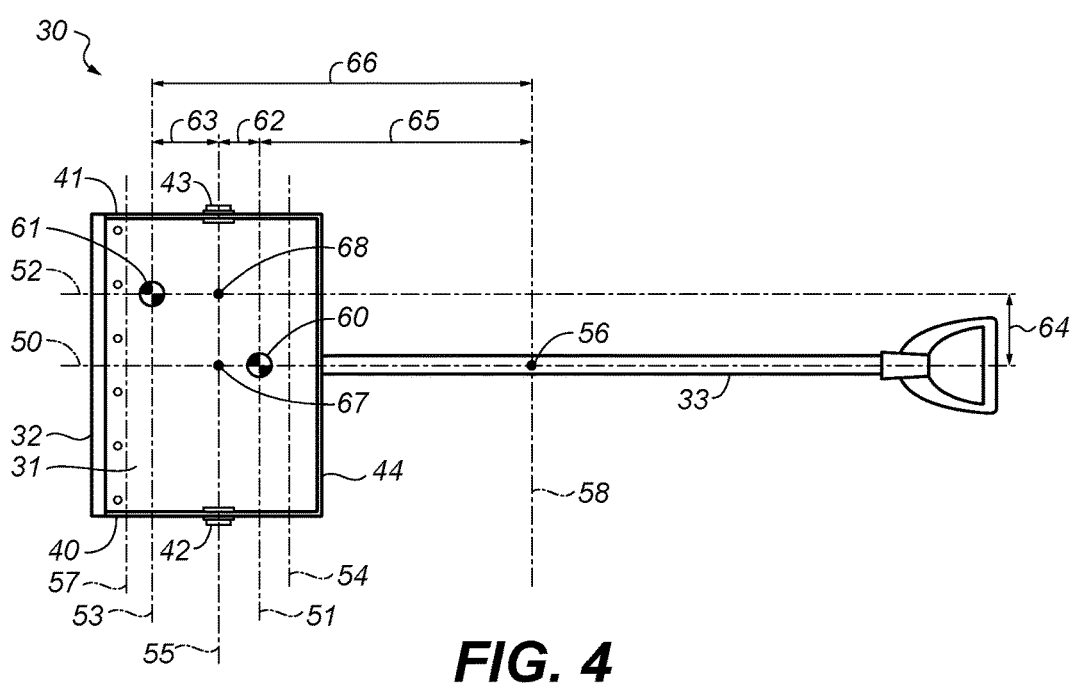
FIG. 4 is partial top view of one non-limiting example of a material moving device illustrating example positions for the center of mass of the head of the material moving device when loaded with material.

FIG. 4 depicts a top view of shovel 30 depicted in FIG. 3. In FIG. 4, handle 37 has been omitted for clarity, but pivot structures 42 and 43 where handle 37 couples to head 31 are shown. Two different possible locations for the center of mass of head 31 are illustrated. As noted previously, the CM of the head of a material moving device can vary as the distribution of material in the head changes, but on average the CM of the loaded head will be near the geometric center of the head. First CM location 60 is at the intersection of perpendicular axes 50 and 51 (where axis 50, which is similar to axes 15, 25, and 35, is centered with respect to handle 33), and second CM location 61 is at the intersection of perpendicular axes 52 and 53. Location 56 is a projection onto the top view of shovel 30 of where a user's second hand would grasp grip 28 of handle 27 of shovel 20 in FIG. 2, if one were present. Imaginary axis 55 passes through the centers of pivot points 42 and 43 and is perpendicular to axis 50. Imaginary axis 58 passes through location 56 and is perpendicular to axis 50.

Looking at CM location 60, if shovel 30 is lifted up (out of the paper) by a user holding a second handle at a location aligned with position 56 (such as second handle 27 of FIG. 2), there will not be any torque (twisting) about axis 50. This is desirable. A user grasping second handle 37 (not shown) of shovel 30 can grasp second handle 37 at a point aligned anywhere between the pivot points 42 and 43 since second handle 37 spans between these two points. The user can grasp second handle 37 at a location aligned with projected point 67 which is also aligned with axis 50. In the case of CM location 60, neither lifting shovel 20 by a handle 27 (if present) or lifting shovel 30 by second handle 37 will result in twisting about axis 50.

A much different situation results for pivoting about axes 55 and 58. It can be seen that axis 55 which passes through pivot structures 42 and 43 (and grip location projected point 67) is a short distance 62 from the location of axis 51 which passes through CM 60. When second handle 37 is grasped by a user, there will be a small moment arm 62 between axis 55 and axis 51 resulting is a small torque about axis 55 that must be reacted by the user. The locations of pivot points 42 and 43 are chosen to reduce the length of moment arm 62 between axes 51 and 55 for typical loads placed in shovel head 31.

Axis 58 passes through projected point 56. It can be seen that the distance 65 between axis 58 and axis 51 is substantially greater than the distance 62 between axes 55 and 51. A substantial torque will exist when a shovel is lifted by a user with their hand aligned with position 56. To keep the head 31 from pivoting forward and spilling the load, this torque must be reacted by the user. This is extraneous work. Having to supply this extra work makes shoveling more fatiguing and is undesirable. By coupling second handle 37 to head 31 (as opposed to coupling to elongated handle 23), the distance between the average location of the CM of a loaded head and the grip location on second handle 37 is reduced.

Second handle 37 is coupled to head 31 which provides benefit over prior art devices that couple a second handle to the long handle of the material moving device (such as the earlier example where handle 27 was coupled to handle 23 of shovel 20). Coupling handle 37 to head 31 provides a coupling location closer to the average location of the CM of loaded head 31 than is obtained when a second handle is coupled to handle 33.

In one non-limiting example the coupling locations of second handle 37 to head 31 are located on side walls 40 and 41. In one non-limiting example, the coupling locations of second handle 37 to head 31 (such as pivot locations 42 and 43) are located in side walls 40 and 41 displaced longitudinally forward of rear wall 44 of head 31 and longitudinally rearward of front chipping edge 32. By shifting coupling locations longitudinally forward of rear wall 44 and longitudinally rearward of front chipping edge 32, an imaginary axis 55 passing through the centers of the coupling locations will pass closer to the average longitudinal position of the CM of a loaded head 31. When the longitudinal displacement between imaginary axis 55 and the longitudinal position of the CM of loaded head 31 is reduced, torque about axis 55 is reduced. This torque has to be reacted by the user in order to keep the shovel head from tilting and spilling its load. Locating coupling locations to reduce the distance between imaginary axis 55 and the longitudinal position of the loaded head CM reduces torque the user must react, which reduces extraneous work the user must provide making the device easier and less strenuous to use In one non-limiting example, the imaginary axis 55 passing through the centers of the coupling locations is longitudinally centered with respect to head 31. Axis 53 is $\frac{3}{4}$ of the longitudinal head span forward of rear wall 44 and axis 51 is $\frac{1}{4}$ of the longitudinal head span forward of rear wall 44. In one non-limiting example, axis 55 is located between axes 51 and 53 such that axis 55, (which passes through the centers of the two coupling locations of handle 37 to head 31) resides in the middle $\frac{1}{2}$ of the longitudinal span of head 31. Axis 57 is $\frac{7}{8}$ of the longitudinal head span forward of rear wall 44 and axis 54 is $\frac{1}{8}$ of the longitudinal head span forward of rear wall 44. In one non-limiting example, axis 55 is located between axes 54 and 57 such that axis 55 resides in the middle $\frac{3}{4}$ of the longitudinal span of head 31.

Referring again to FIG. 4, a second possible location 61 for the CM of loaded head 31 is shown. Axis 52 passes longitudinally through CM location 61 and is parallel to axis 50 (which longitudinally bisects material moving device 30). If a second handle is gripped at a location aligned with projected location 56 (which is aligned with axis 50 as shown), there is a moment arm of distance 64 between axes 50 and 52. A torque about axis 50 will be present that wants to twist material moving device 30 about axis 50. This torque must be reacted by the user to keep material moving device 30 from twisting and dumping out the load in head 31. Reacting this torque requires extraneous work by the user making using a device with a second handle grip location aligned with axis 50 more difficult and strenuous to use.

By spacing apart two coupling points of second handle 37 to head 31 as shown in the example of FIG. 3 and discussed above, and by providing a region on handle 37 for gripping that spans between the sides of head 31, it is easy for a user to compensate for an off-center load, as represented by CM 61. Second handle 37 spans continuously between coupling locations on either side of head 31. In the example of FIG. 4 the coupling locations are at the locations of pivots 42 and 43 which are coupled to side walls 40 and 41. An off-center load as represented by CM 61 which is displaced laterally away from axis 50 is easily dealt with without requiring extraneous work from the user. The user can simply slide their hand away from the center of second handle 37 towards the side of head 31 where CM 61 is located until their grip location is aligned with projected location 68 on axis 52. When second handle 37 is gripped at a location aligned with axis 52, the twisting torque about the location where the user grips second handle 37 is eliminated, as the moment arm between the grip location and CM 61 location is reduced to zero. A second handle that allows the user to grip the second handle at a location spaced away from the centerline of the material moving device allows the user to easily compensate for off center loads, making the device easier and less strenuous to use.

Referring again to FIG. 4, CM 61 is also located forward of axis 55 (which passes through the two coupling locations of handle 37 to head 31). Distance 63 is a moment arm between axis 55 and the longitudinal position of CM 61 (axis 53). Distance 66 is a moment arm between axis 58 (which is aligned with projected location 56 where a user would grasp handle 27 of material moving device 20 of FIG. 2 if it were present) and axis 53. Distance 66 is substantially larger than distance 63. A user would have to react substantially more torque to keep head 31 from rotating forward about axis 58 when grasping a second handle (where the second handle is coupled to handle 33) at a location aligned with location 56 than the user would be required to react to keep head 31 from tipping forward about axis 55 when grasping second handle 37 (which is coupled to head 31 at coupling locations 42 and 43) at a location aligned with projected locations 67 or 68. By coupling handle 37 to head 31 as shown (through pivot couplings 42 and 43), as opposed to coupling the second handle to handle 33 (in the same manner depicted in FIG. 2 for second handle 27 and elongated handle 23), a user needs to react substantially less torque to keep head 31 from tipping forward.

In the non-limiting example of FIG. 4, coupling locations 42 and 43 are shown as pivoting. If handle 37 is coupled to head 31 using pivot coupling, the user's hand that grasps handle 37 is relieved from having to react any pivoting torque about axis 55. Any torque about axis 55 can be reacted by the user's hand grasping the far end of elongated handle 33. The addition of pivot coupling relieves the user's hand grasping second handle 37 from having to react torque about axis 55 and transfers that requirement to the user's second hand grasping the opposite end of elongated handle 33. This helps reduce the total effort required to use the material moving device of FIG. 4 compared to the devices of FIGS. 1 and 2, as the long lever arm between axis 55 and grip 34 on handle 33 substantially reduces the force needed to be applied to grip 34 to keep head 31 from tipping about axis 55.

In one non-limiting example, handle 37 is formed from a rigid tube bent into a generally U-shaped form. Rigid handle 37 can be pivotably coupled to head 31, as discussed-earlier. The pivot coupling may be free (so that there is relatively little friction affecting the relative rotation), may be damped (by controlling/increasing the amount friction affecting the relative rotation), or may be compliant (where a torsion spring element is used to apply a restoring force directed oppositely to the induced relative rotation). A torsional spring may also provide a damping function. A rotationally compliant pivot coupling is discussed below. A damped and/or a compliant coupling can be helpful to reduce chances of a load tipping about axis 55 when a longitudinally off-center load is present in the head. When a second handle is pivotably coupled to a material moving device, the entire second handle is allowed to rotate relative to the remaining portion of the material moving device, about the pivot coupling location.

Figure 5:
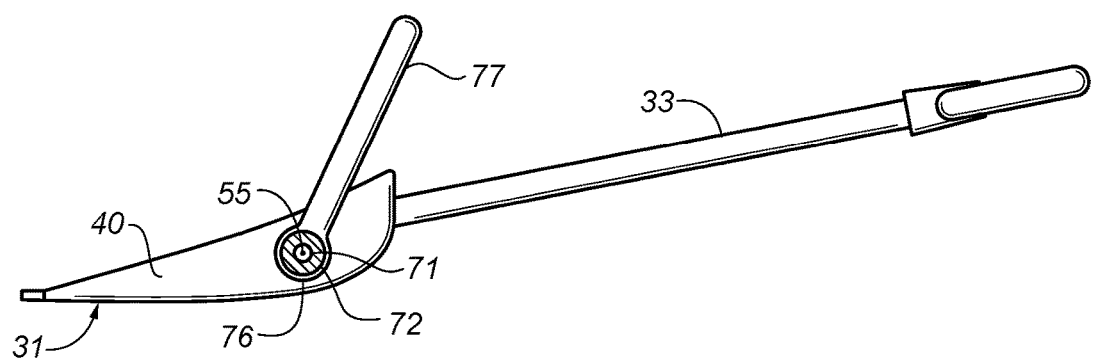
FIG. 5 is a side view of one non-limiting example of a material moving device incorporating a compliant pivot coupling for coupling a second handle to the head of the material moving device.

FIG. 5 depicts a side view of an example material moving device. Elongated handle 33 is rigidly coupled to head 31 as before. Second handle 77 is pivotably compliantly coupled to side wall 40 of head 31 (and is similarly coupled to side wall 41 of head 31, not shown). Post 71 (which extends a short distance outward from side wall 40) is formed as part of head 31 or is rigidly attached to side wall 40 of head 31. Elastomer ring 72 is fixed on its ID to post 71, and on its OD is fixed to the ID of end 76 of handle 77. When handle 77 is moved, end 76 pivots about axis 55 and the elastomer ring 72 is placed in shear which provides a torsional (rotational) restoring force (elastomer ring 72 acts as a torsion spring). The amount of restoring force (or the spring constant) depends on the material properties and geometry. The elastomer ring 72 may also provide damping of relative rotation between post 71 and end 76. In general, it is preferable for a compliant pivot coupling to have high compliance over the normal angular displacement range in use (between about 10° and 75° with respect to the axis of the elongated handle). When a user is holding the material moving device and head 31 is loaded, the user will "throw" the material moving device to send the load (such as snow) to a desired landing area. This action wants to force handle 77 to rotate closer to handle 33. The torsional spring must be energized to do this which requires the user to apply a force, so it is desirable for the torsion spring to have high compliance to minimize the force needed to energize the spring, though having some compliance can be useful to resist inadvertent tipping of the head about the pivot axis, as mentioned previously.

Figure 6:
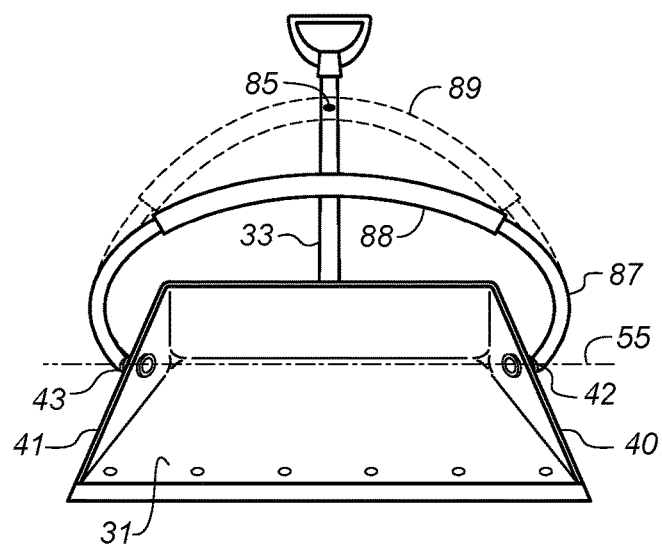
FIG. 6 is a front perspective view of one non-limiting example of a material moving device illustrating deflection of a flexible second handle when lifting a loaded head of the material moving device by the second handle.

In one non-limiting example shown in FIG. 6, a front perspective view of a portion of a material moving device is depicted. Second handle 87 is formed from flexible tubing, such as ½" dia. liquid-tuff non-metallic flex outdoor electrical conduit, or similar flexible polymer tubing. A cylindrically shaped section of foam tube 88 is slipped over the flexible conduit to form a cushioned grip surface. Second handle 87 is pivotably coupled to head 31 with pivot couplers 42 and 43. As described earlier, coupling second handle 87 to head 31 with pivots allows handle 87 to freely rotate about the pivot points so that rotating handle 87 closer to handle 33 does not require energizing a spring (bending the flexible handle toward handle 33 is not required when pivot coupling is used). In this example, the flexible handle provides an in-line, linear spring stiffness, which is described in more detail below. In line springs provide a stiffness element that reacts to forces applied to the second handle that lie in the plane of the second handle. This stiffness operates in a different degree of freedom than the compliant coupling described above.

When a user grasps second handle 87 at location 85 and lifts a loaded head 31, handle 87 changes shape as shown by dotted lines 89. It can be seen that the normal distance between the line 55 joining pivot points 42 and 43 and location 85 where the user grasps handle 87 increases as the handle 87 is lifted by the user. In other words, the effective pivot radius increases. The bending stiffness of the flexible tube resists the shape change and imparts an in-line spring characteristic. This in-line spring characteristic can be beneficial when lifting a load. As a user first starts to lift head 31 by pulling up on handle 87 with their hand in location 85, the spring formed by handle 87 is energized and is stretched before the loaded head starts to lift off the ground. This allows the force to lift the loaded head to be applied more gradually than if no in-line spring were present. Having an in-line spring characteristic reduces "jerk" needed to start moving the loaded head and improves feel. Additionally, when the load in the head is "thrown" off, the energy stored in the energized in-line spring is returned and aids "throwing" the load. In one non-limiting example, the pivot radius increases approx. 4" from the pivot radius at rest, when head 31 is loaded with 20 lbs. of material and is lifted by handle 87. In this example, the spring constant is approx. 872.5 N/m.

It has been found that a useful range of spring constant for an in-line spring associated with a second handle (such as handle 37) is between 3,500 N/m (corresponding to 1" deflection for 20 lbs. of force applied) and 400 N/m (corresponding to approx. 9" of deflection for 20 lbs. of force applied). While a stiffer spring can be used, the benefit compared to having a coupling without a spring decreases to the point that adding such a spring is of minimal value. While a softer spring can be used, either the amount of deflection of the spring must increase or the spring deflection reaches a stop which then results in some jerk. Having more than 9" of deflection of a spring in the second handle makes it more difficult for a user to lift the head of the material moving device off the ground because they have to raise their arm beyond the point where lifting strength begins to decrease.

Figure 7:
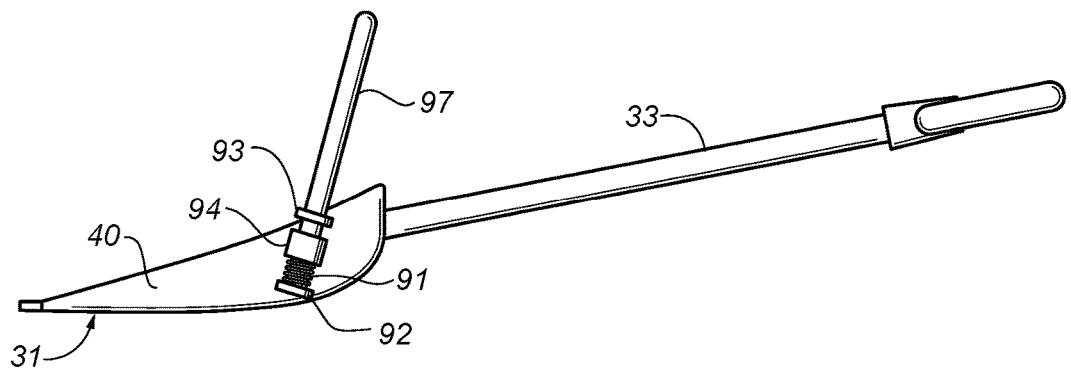
FIG. 7 is a side view of one non-limiting example of a material moving device illustrating incorporating an in-line spring into a pivot coupling of a second handle to the head of the material moving device.

FIG. 7 depicts one non-limiting example of a material moving device coupling assembly. Only one coupling assembly is shown and described, even though a pair of coupling assemblies are used in the examples disclosed herein. Example material moving devices use a pair of coupling assemblies, one located on each side of head 31. Second handle 97 is formed from a rigid material. Stop 92 is located at the end of handle 97 and stop 93 is located a distance up the shaft of handle 97 from stop 92. Bushing 94 is coupled to side wall 40 of head 31. Bushing 94 can be rigidly coupled to head 31 or can be pivotably coupled to head 31. Stops 92 and 93 along with the height of bushing 94 determine how much relative linear motion is possible between handle 97 and bushing 94. The total travel is equal to the distance between stops 92 and 93 less the height of bushing 94. The travel of handle 97 relative to head 31 is limited between the point where stop 93 contacts the top of bushing 94 and the point where stop 92 contacts the bottom of bushing 94.

In-line spring 91 is fit around the shaft of handle 97 and sits between stop 92 at the end of handle 97 and bottom of bushing 94. When head 31 is lifted by handle 97, spring 91 is energized by being compressed, and reduces "jerk" when head 31 is lifted off the ground. Stop 93 limits travel of the shaft of handle 97 if a user is pushing on handle 97 so that the end of handle 97 does not extend past the bottom surface of head 31. This helps prevent damage to the bottom of the shaft of handle 97. It should be noted, though, that stop 93 is not strictly required for the coupling assembly to provide the in-line spring characteristic. Though not shown, spring 91 could be located between the top of bushing 94 and stop 93. In this case, however, the ends of spring 91 would need to be attached to the top of bushing 94 and to stop 93. With such an arrangement, spring 91 would be energized by being extended when head 31 was lifted by handle 97.

The earlier discussion regarding a useful range of spring constant of the in-line spring of handle 87 is also directly applicable to the spring constants of the in-line springs disclosed here (spring 91 located between stop 82 and bushing 94 that is compressed under load or a similar spring located between and fixed to bushing 94 and stop 93 that is extended under load), with the exception of the maximum displacement allowed. In line springs as shown in FIG. 7 and discussed above allow the pivot radius to increase between 1 and 4 inches, when the in line spring is energized by lifting handle 97, when a load of 20 lbs. is located in head 31. Accommodating more than 4" of deflection becomes difficult without increasing the height of the side wall 40 (and 41) of head 31 beyond what would otherwise be needed so that stop 92 does not contact the ground in use.

Figure 8:
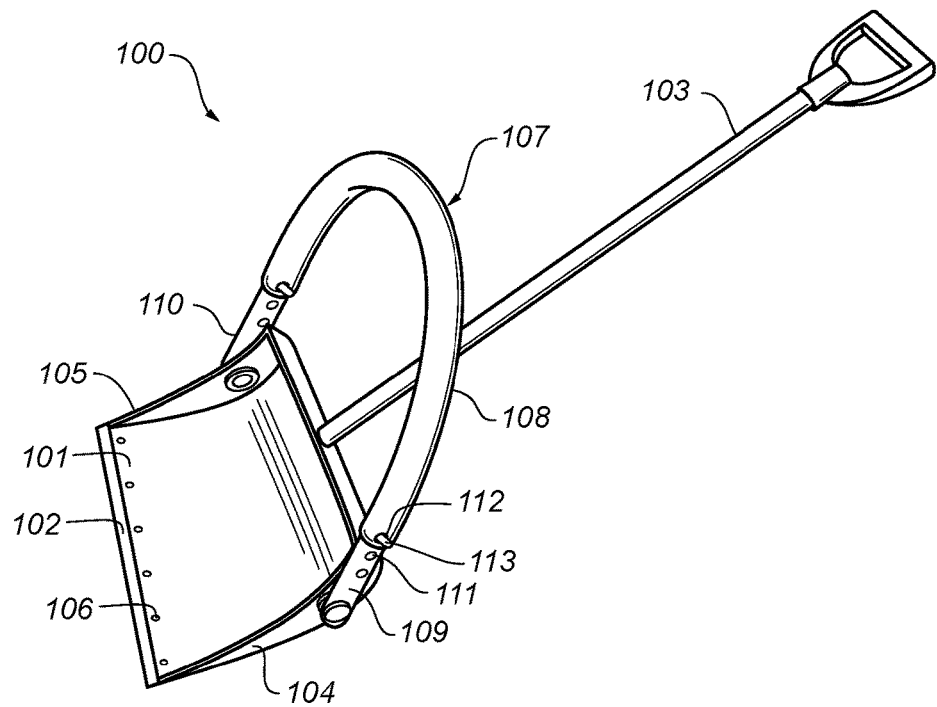
FIG. 8 is a side perspective view of one non-limiting example of a material moving device illustrating a user adjustable handle length mechanism for a second handle of the material moving device.

A user adjustable handle length mechanism can be added to a material moving device to allow the length (or for pivotably coupled handles the pivot radius) of a second handle to be changed by a user, to accommodate differences in user height. In one non-limiting example depicted in FIG. 8, a user adjustable handle length mechanism for second handle 107 is formed from arms 109 and 110, connector 108 and locking pins 113. Arms 109 and 110 have an OD slightly smaller than the ID of ends of connector 108 so that arms 109 and 110 slide inside the ends of connector 108. Arms 109 and 110 have a series of thru holes 111 located up the top ends of the arms. The number and spacing of holes can be set as desired by the manufacturer. One thru hole 112 is drilled through each end of connector 108. Arms 109 and 110 are coupled to connector 108 by inserting a locking pin 113 through hole 112 and one of holes 111. The user can remove locking pins 113, slide arms 109 and 110 further into or out of connector 108 as desired and re-insert locking pins 113 to change the effective length of second handle 107.

Other known user adjustable handle length mechanisms may also be used and are contemplated herein. In one non-limiting example (not shown), the user adjustable handle length mechanism is formed by cutting threads in the OD of top ends of arms 109 and 110, down a length of each arm, and corresponding threads can be cut on the ID of each end of connector 108. To adjust handle 97 length, arms 109 and 110 can be removed from coupling mechanisms that couple bottom ends of arms 109 and 110 to head 31 and then screwed into or unscrewed relative to connector 108. In one non-limiting example, rather than sliding a locking pin through holes formed in the arms and connector as shown, one of the connector or the arms could include a spring snap feature while the other component includes a series of holes. The spring snap can be depressed and the relative position of the arms and connector adjusted until the spring snap "snaps" into a desired hole. Alternatively, example material moving devices may use other known forms of telescoping tubing to provide a user adjustable handle length mechanism that allows variation in handle length. Handle length adjustment mechanisms can be used with any of the second handle examples described herein.

Referring back to FIG. 7, in one non-limiting example a user adjustable handle length mechanism for second handle 97 is formed by constructing stops 92 and 93 so that their locations with respect to the shaft of handle 97 can be adjusted by a user. The user can slide stops 92 and 93 along the shaft of handle 97 to change the effective length of handle 97. Use of any other known mechanism for adjusting the effective length of a shaft (such as shaft of handle 97 or any of the example second handles disclosed) are also contemplated herein.

In one non-limiting example (not shown), arms 109 and 110 incorporate a user adjustable handle length mechanism such as a telescoping structure, sections with holes and locking pins, or other structures mentioned above, while connector 108 is formed from a flexible tube material. This allows a flexible handle to be used with a user adjustable handle length mechanism for a second handle of a material moving device. This example handle can be pivotably coupled to a head of a material moving device or can be fixedly coupled to the head of the material moving device.

Figure 9A:
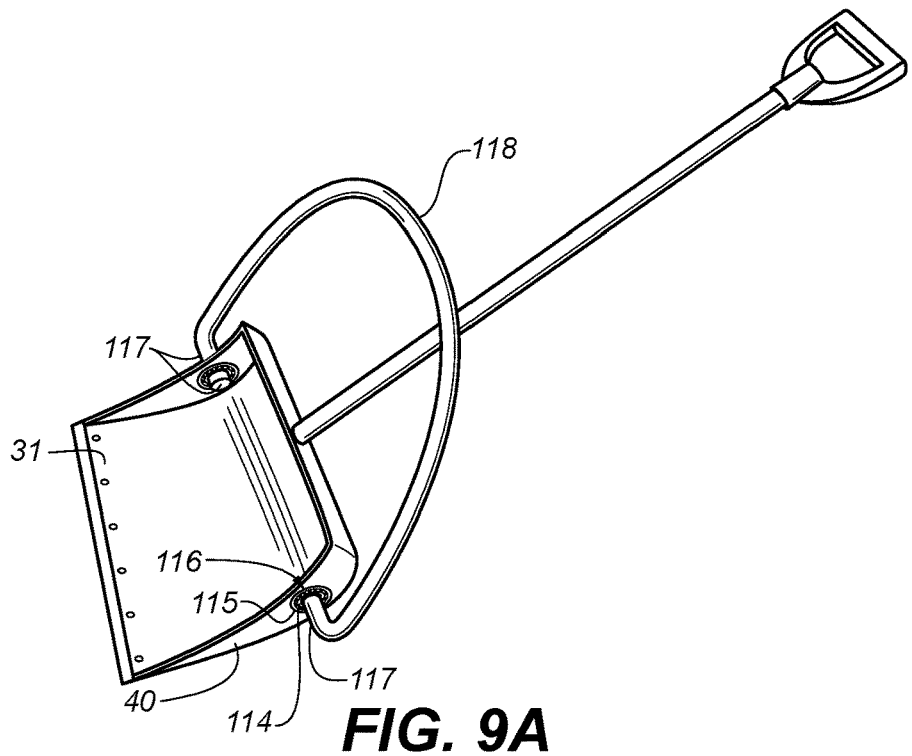
FIG. 9A is a side perspective view of one non-limiting example of a material moving device illustrating a pivot coupling structure that incorporates a ball bearing.

As described earlier, a material moving device may use a second handle that is pivotably coupled to a head of the material moving device. In one non-limiting example shown in FIG. 9A, the pivot coupling mechanism includes ball bearing 116. Inner race 114 of bearing 116 is fixed to the end portion 117 of handle 118. Handle 118 is bent at approximately a 90 degree angle so the end 117 of handle 118 can fit thru bearing 116 when the bearing 116 is affixed to side wall 40 of head 31. Outer race 115 of bearing 116 is fixed to an opening in side wall 40 of head 31. Features may be molded into side wall 40 that allow bearing 116 to snap in or be press fit into place. Outer race 115 of bearing 116 may be fixed to side wall 40 using a simple friction or interference fit, adhesives, or could be insert molded in place. Any known method of securing a bearing into a wall is contemplated herein and may be used to fix bearing 116 into side wall 40.

Figure 9B:
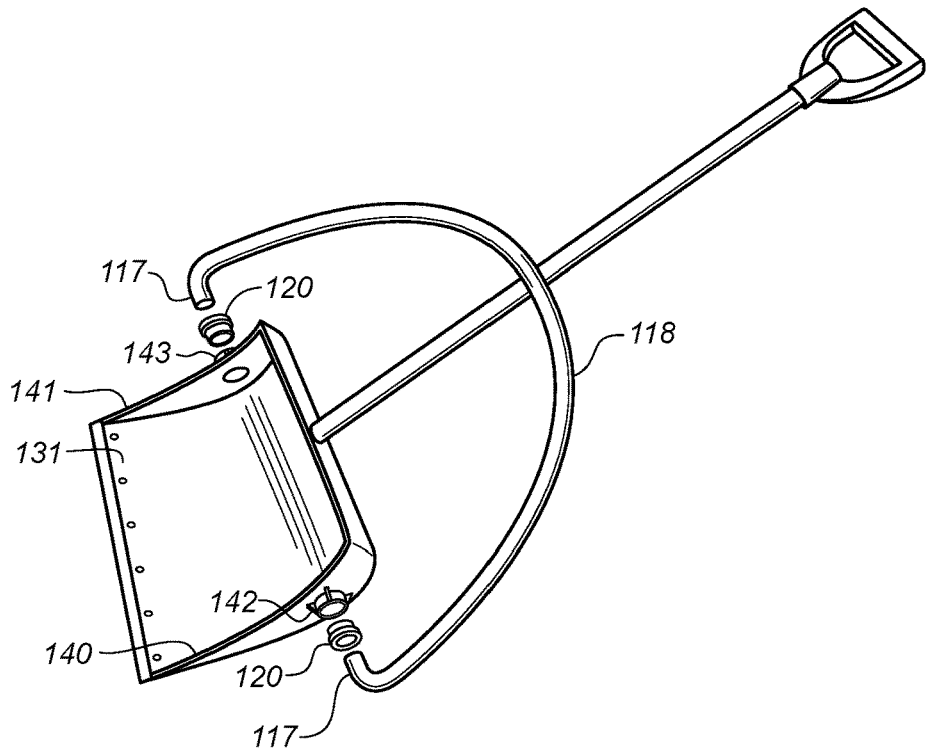
FIG. 9B is a side perspective view of one non-limiting example of a material moving device illustrating an alternative pivot coupling structure.

One non-limiting example pivot coupling is shown in FIG. 9B. Rather than using a ball bearing, in this example cylindrical boss structures 142 and 143 are molded into side walls 140 and 141 of head 131. The IDs of opening structures 142 and 143 are slightly larger than the OD of the ends 117 of handle 118 such that the ends 117 of handle 118 fit through the openings. Bushings 120 can be, but are not required to be, fit onto ends 117 of handle 188 which then fit into opening structures 142 and 143. Bushings 120 provide controlled sliding surfaces to control friction when handle 118 is rotated relative to boss structures 142 and 143. Adding separate bushings allows the bushing material to be different from the head material or the handle material so that improved sliding and wear behavior is obtained. Additionally, as sliding surfaces wear, bushings 120 can be easily and inexpensively replaced. In one non-limiting example, head 131 is formed from ABS, polypropylene, or other thermoplastic polymer materials, handle 118 is formed from extruded aluminum tubing bent to shape, and bushings 120 are made from Nylon 6/6. In one non-limiting example, simple holes are formed in side walls of head 31 and snap in bushings which are well known in the art are fit into the holes to accommodate the ends 117 of handle 118.

Figure 10A:
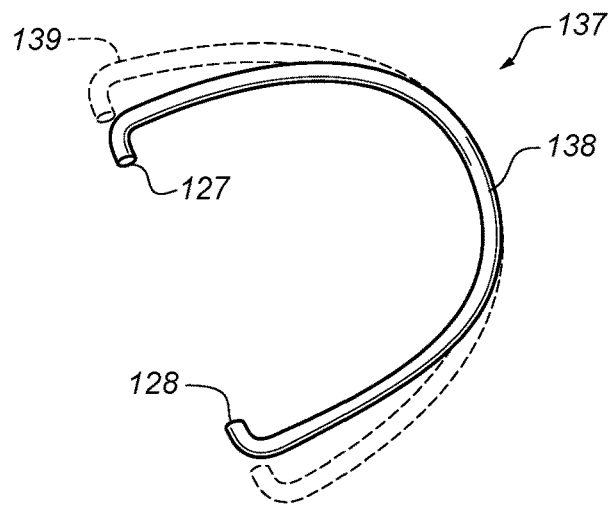
FIG. 10A is a perspective view of one non-limiting example of a second handle of a material moving device depicting the handle at rest and in an expanded position for assembly of the second handle to a head of the material moving device.

FIG. 10A depicts one non-limiting example of a second handle for a material moving device, such as the device depicted in FIG. 9B. In this example, handle 137 is formed from tubing 138 that is bent into a desired shape. Various materials can be used for the tubing 138 such as aluminum, steel, brass, plastic, etc. The second handle 137 could also be directly formed from various plastics, fiberglass, various metals, etc. to a net shape (via molding, casting or other net shape process) if desired. Two positions of handle 137 are shown. The at-rest position of handle 137 is depicted in solid lines, and a deflected position 139 of handle 137 is shown in dotted lines. It is desirable if the spacing between ends 127 and 128 of handle 137 at rest is smaller than the spacing between pivot couplings located on the sides of a head (for example couplings 142 and 143 on head 131 shown in FIG. 9B, though this comment applies to all pivot couplings and heads disclosed herein) of a material moving device to which second handle 137 is affixed. The ends 127 and 128 can be spread apart a sufficient distance to allow handle ends 127 and 128 to be inserted into pivot couplings 142 and 143. When the ends 127 and 128 of handle 137 are spread apart, handle 137 acts like a spring being stretched. The restoring force applied by energizing this spring acts to keep handle ends 127 and 128 in place once ends 127 and 128 are inserted through the pivot couplings. The shape of handle 137, the diameter and wall thickness and the material chosen for tube 138 determine the spring force acting to keep ends 127 and 128 from being separated. This spring force is chosen to be sufficiently large so that in use it is unlikely the ends will have enough force applied that would cause them to separate sufficiently for handle 137 to pop out of the head to which it is attached, but not so large as to prevent a user from purposefully separating the ends a sufficient amount to remove handle 137 from the head to which it is attached.

It should be noted that rather than constructing handle 137 such that ends 127 and 128 bend inward and the end separation is increased in order to insert the ends into coupling structures on the side walls of the head, ends 127 and 128 could be bent to face outwards, where the ends at rest span a wider distance that the spacing between side walls. In this example, the ends would have to be pressed together (rather than pulled apart) in order to be inserted into the head. Either construction provides a second handle with a stiffness that is used to hold ends 127 and 128 in place once they are inserted into coupling structures located on the side walls of the material moving device head.

If desired, once handle 137 is in place on the head of a material moving device, the tips of ends 127 and 128 can be flared out by a reaming or forming operation (not shown) until the ends have a diameter larger than the ID of the pivot coupling, so that ends 127 and 128 are prevented from passing back through the openings in the pivot couplings. Alternatively, caps (not shown) can be fit to ends 127 and 128 after insertion in a head where the caps have a structure incorporated into the cap with an OD larger than the ID of the pivot coupling so that the caps prevent the ends 127 and 128 from passing back through the openings in the pivot couplings.

Figure 10B:
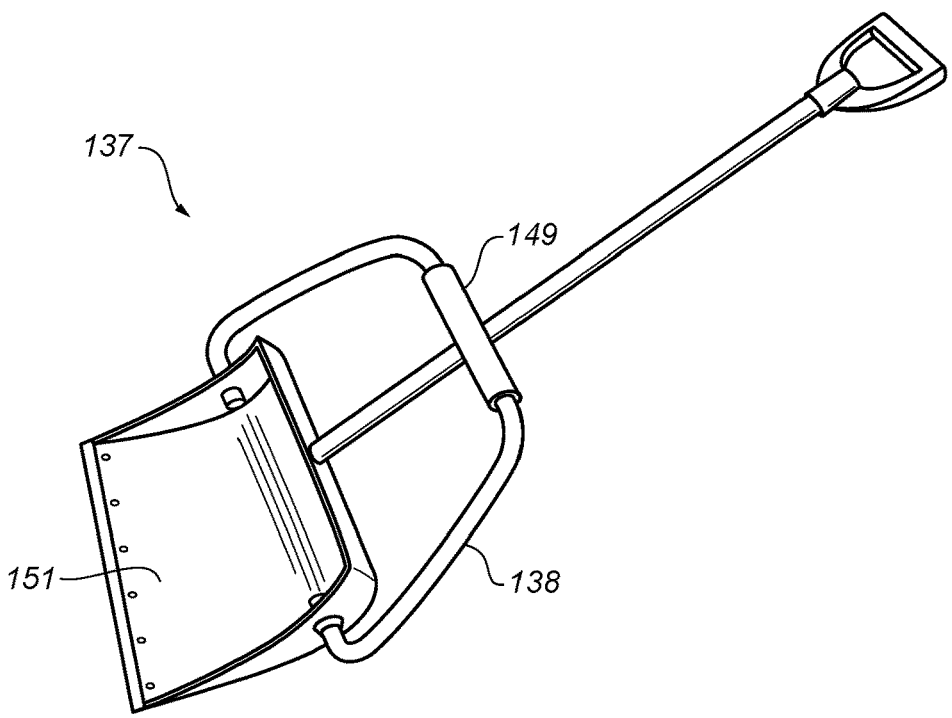
FIG. 10B is a perspective view of one non-limiting example of a material moving device with a second handle inserted into the head of the material moving device.

FIG. 10B depicts handle 137 attached to head 151 of a material moving device, with grip 149 slid over tube 138 of handle 137. Grip 149 is a cylindrical tube with a hole therethrough which is fit over inner tube 138. Grip 149 can be formed from any known cushioning material such as a polymer foam (open or closed cell), a thermoplastic elastomer, or other known soft material usable in a grip application. In the example depicted in FIG. 10B, grip 149 spans a section of inner tube 138 that is aligned between sides of head 151 of the material moving device to which handle 147 is affixed, and grip 149 is fixed to tube 138 so that it generally does not move relative to inner tube 138. This allows a user to vary the location they grasp the grip to any position with a projected location between the sides of head, to compensate for off center loads that may be present in the head.

Figure 10C:
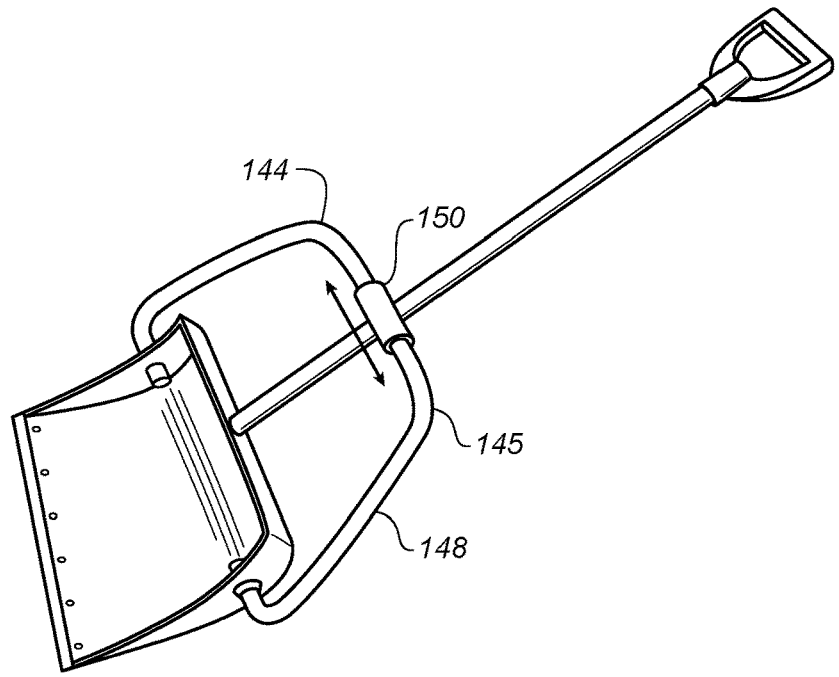
FIG. 10C is a perspective view of one non-limiting example of a material moving device with a second handle inserted into the head of the material moving device.

In one non-limiting example depicted in FIG. 10C, grip 150 is only slightly wider than a typical user's hand. Rather than grip 149 where the grip material spanned a region on inner tube 138 between the sides of head 151, grip 150 is allowed to slide back and forth on inner tube 148 between bends 144 and 145 on inner tube 148 which spam approx. between the sides of head 161. Allowing grip 150 to slide back and forth allows a user to compensate for off center loads by sliding the grip to the left or right as needed. In one non-limiting example, the friction between the grip and inner tube is controlled so that the grip does not easily slide on its own, but is kept small enough such that the user can reposition the grip along the inner tube with application of a small force. One way to accomplish this is to control the materials and surfaces to control the coefficient of friction obtained. Another method to accomplish this (which may be done alone or in combination with controlling materials) is to impart a slight curvature to either inner tube 148 or grip 150 such that grip 150 is slightly deformed when it is in place on inner tube 148. This applies a small holding force to keep grip 150 from easily sliding.

The various second handles disclosed herein have been described as having been formed from structures that have a tubular geometry. The cross section of this geometry can be round but need not be. The cross section shape is not limited in any way. Other cross section shapes such as oval, racetrack, rectangular, etc. are also contemplated herein. Additionally, the materials used as "inner tubes" that form the second handle structures need not be tubes at all. These structures could be solid or formed from strands (such as stranded cable), rather than tubular if desired.

Figure 11:
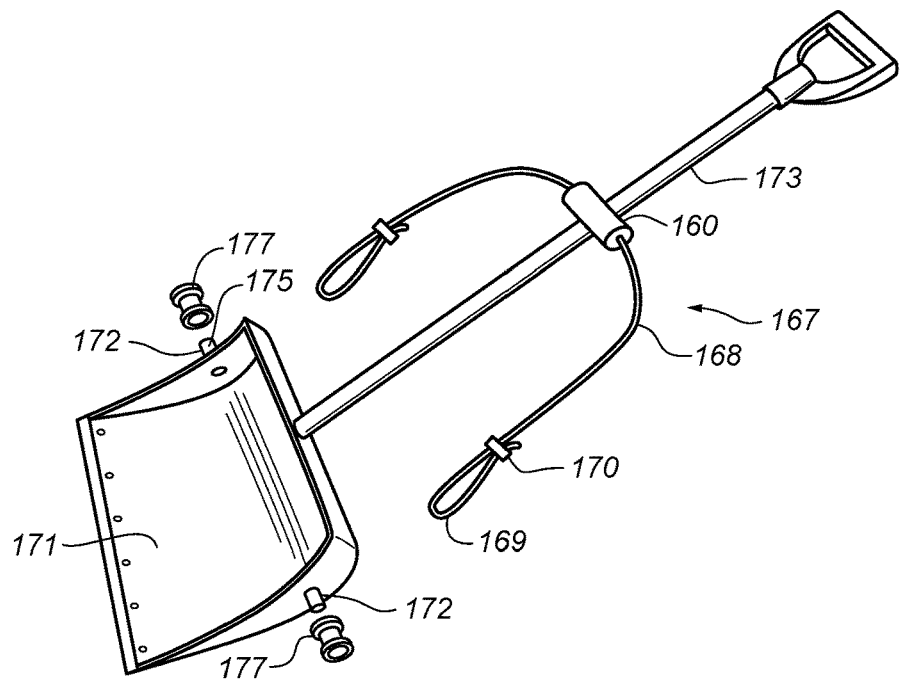
FIG. 11 is a perspective view of one non-limiting example of a material moving device with a second handle formed from a cable.

In one non-limiting example depicted in FIG. 11, second handle 167 is coupled to head 171 of a material moving device. Second handle 167 is flexible at least in bending, and is formed from a cable 168, which may be vinyl or PVC coated stainless steel cable, other coated wire cable, or synthetic rope or other cord material of sufficient strength. Handle 160 is slid over cable 168. End loops 169 are formed in ends of cable 168 using crimps 170. Loops 169 are looped around posts 172. If desired, cable loops 169 can be looped around bushings 177, and bushings 177 are then slipped onto bearing surface 175 of posts 172. Loops 169 are able to rotate relative to posts 172 to provide a pivot coupling. It should be noted here that the ends of cable 168 could also be fixed to head 171. In one non-limiting example, cable 168 is also flexible in elongation (such as a bungee cord). This can provide an in-line spring characteristic, as described earlier. Spring constants described earlier are also applicable to an in-line spring from a cable flexible in elongation.

In one-non-limiting example, a second handle can be provided as a kit to a user so that the user can add the second handle to an existing material moving device. A template can be provided that allows a user to mark locations for where to make holes in the head of a user's existing material moving device. The templates provide proper hole size to work with the included second handle.

A second handle can be included as part of a kit for application to an existing material moving device. A second handle such as handle 137 of FIG. 10A is provided. The second handle couples to the head of the user's material moving device in two places spaced laterally apart, preferably on the side walls of the head of the user's material moving device. A template can be provided with the kit for marking appropriate locations and sizes for holes in side walls to accommodate the ends of the second handle. Pivot structures can be coupled into the holes formed in the head, such as any of the earlier described pivot assemblies. A snap in bushing can be provided as the pivot structure. Structures such as those depicted in FIG. 7 can be added to a rigid handle such as handle 137 of FIG. 10A to provide the second handle kit an in-line spring capability. The second handle may be rigid or flexible. The second handle may provide an in-line spring characteristic. The second handle ends are inserted through holes in the side of the user's existing material moving device or are affixed to pivot or torsion spring coupling structures which are affixed to the head of the user's material moving device. A handle length adjustment mechanism as described earlier can be included as part of the second handle kit assembly. Structures such as a clip or a detent mechanism may be included as part of the kit assembly to allow the second handle to be placed in a fixed position. A clip may be fixed to the elongated handle of the user's existing material moving device so that the second handle provided in the kit, when assembled to the user's material moving device, can be clipped to the elongated handle (for example for storage or for when use of the second handle is not desired). Alternatively, a detent mechanism to provide a fixed position of the second handle can be incorporated as part of pivot coupling mechanisms. A second handle that is a cable that is flexible at least in bending may be provided as part of the kit. The cable may also be A number of implementations have been described. Nevertheless, it will be understood that additional modifications may be made without departing from the scope of the inventive concepts described herein, and, accordingly, other embodiments are within the scope of the following claims.

What is claimed is:

1. An apparatus for moving material by hand comprising:
a head for receiving material;
a first elongated handle having first and second ends, the first end rigidly coupled to the head, the elongated handle characterized by a central axis extending away from a rear portion of the head generally in the direction of a longitudinal centerline of the head;
a first grip coupled to the second end of the first handle, for holding by a first hand of a user, and;
a second handle,
wherein the second handle is generally U shaped having first and second ends and a central portion therebetween, wherein the first end of the second handle is pivotably coupled to a first coupling location on a first side wall of the head and the second end of the second handle is pivotably coupled to a second coupling location on a second side wall of the head, the central portion for holding by a second hand of a user,
wherein the second handle is constructed and arranged to allow the user's second hand to be slidable along the central portion, to allow the user to slide a location where the user holds the central portion from a first location on the central portion aligned with the longitudinal centerline of the apparatus for moving materials to a second location on the central portion displaced away from the longitudinal centerline of the apparatus for moving materials,
wherein the second handle further comprises a first spring, wherein the first spring is fit around the first end of the second handle, the first spring sitting between a first stop located on the first end of the second handle and a bushing coupled to the first side wall, wherein the spring is energized when the material moving apparatus is lifted by the second handle.

2. The material moving apparatus of claim 1 wherein when the material moving apparatus is lifted by the second handle and the head of the material moving device is loaded with 20 lbs. of material to be moved, the normal distance between the location of the user's hand on the second handle and an imaginary line joining the first and second coupling locations increases by between 1 and 9 inches compared to the normal distance at rest.

3. An apparatus for moving materials by hand comprising:
a head for receiving materials;
a first elongated handle having first and second ends, the first end rigidly coupled to the head, the elongated handle characterized by a central axis extending away from a rear portion of the head generally in the direction of a longitudinal centerline of the head;
a first grip coupled to the second end of the first handle, for holding by a first hand of a user, and;
a second handle,
wherein the second handle is generally U shaped having first and second ends and a central portion therebetween, wherein the first end of the second handle is pivotably coupled to a first coupling location on a first side wall of the head and the second end of the second handle is pivotably coupled to a second coupling location on a second side wall of the head, the central portion for holding by a second hand of a user,
wherein the second handle is constructed and arranged to allow the user's second hand to be slidable along the central portion, to allow the user to slide a location where the user holds the central portion from a first location on the central portion aligned with the longitudinal centerline of the apparatus for moving materials to a second location on the central portion displaced away from the longitudinal centerline of the apparatus for moving materials,
wherein the second handle is formed from a rigid tube, wherein a grip structure is fit around a portion of the rigid tube.

4. The material moving apparatus of claim 3 wherein the second handle is constructed and arranged to provide a stiffness which is used to hold the first and second ends in place in first and second coupling structures located at the first and second coupling locations, wherein the spacing between the first and second ends when the handle is in a rest position is smaller than the spacing between the first and second coupling structures, wherein the second handle is constructed and arranged so that the spacing between the first and second ends must be increased in order to fit the first and second ends into the first and second coupling structures.

5. The material moving apparatus of claim 3 wherein the grip structure spans the width of the head of the material moving apparatus.

6. The material moving apparatus of claim 3 further comprising a user adjustable handle length mechanism, wherein the user adjustable handle length mechanism is constructed and arranged to allow the user to alter a pivot radius of the second handle.

7. The material moving apparatus of claim 6 wherein the user adjustable handle length mechanism comprises first and second arms and a connector section joining the pair of arms, wherein first and second arms can slide back and forth relative to the ends of the connector.

8. The material moving apparatus of claim 3 further comprising:
a structure incorporated into a pivot coupling mechanism that pivotably couples the second handle to the head, the structure capable of holding the second handle in a fixed location with respect to the first handle of the apparatus for moving materials.

9. An apparatus for moving materials by hand comprising:
a head for receiving materials;
a first elongated handle having first and second ends, the first end rigidly coupled to the head, the elongated handle characterized by a central axis extending away from a rear portion of the head generally in the direction of a longitudinal centerline of the head;
a first grip coupled to the second end of the first handle, for holding by a first hand of a user, and;
a second handle, wherein the second handle is generally U shaped having first and second ends, wherein the first end of the second handle is pivotably coupled to a first coupling location on a first side wall of the head and the second end of the second handle is pivotably coupled to a second coupling location on a second side wall of the head, for holding by a second hand of a user wherein the second handle is formed from a rigid tube, wherein a grip structure is fit around a portion of the rigid tube, and;

wherein the grip structure can be slid back and forth by the user over the portion of the rigid tube to enable the user to adjust their grip location to compensate for variations in the center of mass of the head when loaded with material to be moved.

10. An apparatus for moving materials by hand comprising:

a head for receiving materials;

a first elongated handle having first and second ends, the first end rigidly coupled to the head, the elongated handle characterized by a central axis extending away from a rear portion of the head generally in the direction of a longitudinal centerline of the head;

a first grip coupled to the second end of the first handle, for holding by a first hand of a user, and;

a second handle, wherein the second handle is generally U shaped having first and second ends and a central portion therebetween, wherein the first end of the second handle is pivotably coupled to a first coupling location on a first side wall of the head and the second end of the second handle is pivotably coupled to a second coupling location on a second side wall of the head, the central portion for holding by a second hand of a user, wherein the second handle is constructed and arranged to allow the user's second hand to be slidable along the central portion, to allow the user to slide a location where the user holds the central portion from a first location on the central portion aligned with the longitudinal centerline of the apparatus for moving materials to a second location on the central portion displaced away from the longitudinal centerline of the apparatus for moving materials, wherein the second handle is formed from a flexible tube, wherein the flexible tube provides an in-line spring having a spring force, the spring force provided by a bending stiffness of the flexible tube that resists a shape change of the second handle when the apparatus for moving materials is lifted by the second handle.

11. The material moving apparatus of claim 10 wherein an imaginary line connecting the first and second coupling locations is located longitudinally forward of a rear wall of the head and longitudinally rearward of a front chipping edge of the head.

12. The material moving apparatus of claim 11 wherein the imaginary line connecting the first and second coupling locations is longitudinally aligned with an average expected location of the center of mass of the material moving apparatus when the head is loaded with material to be moved.

13. The material moving apparatus of claim 11 wherein the imaginary line connecting the first and second coupling locations intersects a center plane that longitudinally bisects the head within the middle ¾ of the longitudinal span of the head.

14. The material moving apparatus of claim 10 wherein a grip structure is fit around a portion of the flexible tube.

15. The material moving apparatus of claim 14
wherein the grip structure spans the width of the head of the material moving apparatus.

16. The material moving apparatus of claim 10 wherein a pivot radius of the second handle is greater than one half of the length of the first elongated handle.

17. The material moving apparatus of claim 16 wherein the pivot radius of the second handle is less than the length of the first elongated handle.

18. The material moving apparatus of claim 10 wherein when the material moving apparatus is lifted by the second handle and the head of the apparatus for moving materials is loaded with 20 lbs. of material to be moved, the normal distance between the location of the user's hand on the second handle and an imaginary line joining the first and second coupling locations increases by between 1 and 9 inches compared to the normal distance at rest.

19. An apparatus for moving materials by hand comprising:

a head for receiving material;

a first elongated handle having first and second ends, the first end rigidly coupled to the head, the elongated handle characterized by a central axis extending away from a rear portion of the head generally in the direction of a longitudinal centerline of the head;

a second handle, wherein the second handle is generally U shaped having first and second ends and a central portion therebetween, wherein the first end of the second handle is pivotably coupled to a first coupling location on a first side wall of the head and the second end of the second handle is pivotably coupled to a second coupling location on a second side wall of the head, the central portion for holding by a second hand of a user, wherein the second handle is constructed and arranged to allow the user's second hand to be slidable along the central portion, to allow the user to slide a location where the user holds the central portion from a first location on the central portion aligned with the longitudinal centerline of the apparatus for moving materials to a second location on the central portion displaced away from the longitudinal centerline of the apparatus for moving materials, wherein the second handle is formed from a rigid tube, wherein the second handle is constructed and arranged to provide a stiffness which is used to hold the first and second ends in place in first and second coupling structures located at the first and second coupling locations, wherein the spacing between first and second ends at rest is larger than the spacing between first and second coupling structures, wherein the second handle is constructed and arranged so that the spacing between the first and second ends must be decreased in order in order to fit the first and second ends into the coupling structures.

* * * * *